US010138899B2

(12) United States Patent
Joubert et al.

(10) Patent No.: US 10,138,899 B2
(45) Date of Patent: Nov. 27, 2018

(54) ELECTRIC PROPULSION ASSEMBLY FOR AN AIRCRAFT

(71) Applicant: AIRBUS SAS, Blagnac (FR)

(72) Inventors: Emmanuel Joubert, Issy les Moulineaux (FR); Hichem Smaoui, Paris (FR); Charles Nespoulous, Saint Cloud (FR); Bruno Rechain, Paris (FR)

(73) Assignee: AIRBUS SAS, Blagnac (FR)

( * ) Notice: Subject to any disclaimer, the term of this patent is extended or adjusted under 35 U.S.C. 154(b) by 188 days.

(21) Appl. No.: 14/898,127

(22) PCT Filed: Jun. 13, 2014

(86) PCT No.: PCT/EP2014/062426
§ 371 (c)(1),
(2) Date: Dec. 12, 2015

(87) PCT Pub. No.: WO2014/198923
PCT Pub. Date: Dec. 18, 2014

(65) Prior Publication Data
US 2016/0137305 A1 May 19, 2016

(30) Foreign Application Priority Data

Jun. 14, 2013 (FR) .................................... 13 55557

(51) Int. Cl.
F04D 29/58 (2006.01)
F04D 25/08 (2006.01)
(Continued)

(52) U.S. Cl.
CPC ......... *F04D 29/5813* (2013.01); *B64D 27/24* (2013.01); *B64D 33/08* (2013.01);
(Continued)

(58) Field of Classification Search
CPC .......... F02C 7/18; F04D 19/002; F04D 25/02; F04D 25/06; F04D 25/0606;
(Continued)

(56) References Cited

U.S. PATENT DOCUMENTS 3,957,230 A 5/1976 Boucher et al.
4,685,289 A * 8/1987 Violett .................... A63H 27/06
446/56

(Continued)

FOREIGN PATENT DOCUMENTS

EP 1 524 190 A2 4/2005
GB 2 152 147 A 7/1985
GB 2 389 174 A 12/2003

*Primary Examiner* — Bryan Lettman
(74) *Attorney, Agent, or Firm* — Greer, Burns & Crain, Ltd.

(57) ABSTRACT

An electric propulsion assembly for an aircraft includes a nacelle having a nacelle cowl which defines an inner space for arranging an electric propulsion unit, which includes a blower, of the aircraft. An electric motor assembly is placed in the inner space and connected to the propulsion unit to supply power to the propulsion unit. An airflow generated by the blower flows in a space between the motor assembly and the nacelle cowl defining a duct to supply thrust to the aircraft. A power electronics system has at least one heat exchanger to transfer thermal energy from the system to a work fluid to cool the system. The heat exchanger is placed to project at least partially into the duct, so that the work fluid consists of the air flow generated by the blower.

7 Claims, 1 Drawing Sheet

(51) Int. Cl.
*F04D 25/06* (2006.01)
*F04D 25/12* (2006.01)
*B64D 27/24* (2006.01)
*B64D 33/08* (2006.01)
*B64D 33/10* (2006.01)
*B64D 33/02* (2006.01)
*B64D 29/02* (2006.01)

(52) U.S. Cl.
CPC ........... *B64D 33/10* (2013.01); *F04D 25/068* (2013.01); *F04D 25/0693* (2013.01); *F04D 25/08* (2013.01); *F04D 25/082* (2013.01); *F04D 25/12* (2013.01); *F04D 29/584* (2013.01); *F04D 29/5806* (2013.01); *B64D 29/02* (2013.01); *B64D 2033/024* (2013.01); *Y02T 50/44* (2013.01); *Y02T 50/64* (2013.01)

(58) Field of Classification Search
CPC ............... F04D 25/0653; F04D 25/068; F04D 25/0693; F04D 25/08; F04D 25/12; F04D 25/082; F04D 29/58; F04D 29/5806; F04D 29/5813; F04D 29/584; F04D 29/5853; H02K 9/00; H02K 9/02; H02K 9/22; H02K 2209/00; B64D 27/24; B64D 33/10; B64D 33/08; B64D 2033/024
See application file for complete search history.

(56) References Cited

U.S. PATENT DOCUMENTS

| 2005/0202713 | A1* | 9/2005 | Morishitahara | F04D 25/0613 |
| | | | | 439/456 |
| 2009/0272854 | A1* | 11/2009 | Violett | A63H 27/02 |
| | | | | 244/53 R |
| 2013/0294930 | A1* | 11/2013 | Pal | F04B 49/06 |
| | | | | 417/44.1 |

* cited by examiner

ELECTRIC PROPULSION ASSEMBLY FOR AN AIRCRAFT

RELATED APPLICATIONS

This application is a § 371 application from PCT/EP2014/062426 filed Jun. 13, 2014, which claims priority from French Patent Application No. 13 55557 filed Jun. 14, 2013, each of which is herein incorporated by reference in its entirety.

BACKGROUND OF THE INVENTION

Field of the Invention

The present invention relates to an electric propulsion assembly for an aircraft having a novel design for cooling the power electronics system thereof.

The invention also relates to an aircraft provided with such an electric propulsion assembly.

Technical Background

The aeronautical industry is a technical field that is constantly evolving and always seeking technological advancements. It is within this context that current research work seeking to reduce the environmental impact of air transport, notably noise and the emission of greenhouse gases falls.

In this context, the concepts of mechanical/electrical hybrid drive or all-electric drive are very promising. Thus, small airplanes such as two-seat private airplanes, all of the propulsion of which is provided by electrical power, are known.

The need to procure higher propulsion powers for larger airplanes results in a significant increase in the amount of heat dissipated by the power electronics systems used to manage and control the amount of electrical energy delivered to the electric drive.

Nowadays there are various technical solutions for cooling power electronic systems.

Thus, power electronics systems incorporating cooling systems using water or even using refrigerant of two-phase type are known.

However, all of these solutions of the prior art are penalizing in terms of the additional weight (fluid, circulatory system, etc.) that they add to the power electronics systems.

It is also known practice to use one or more blowers to remove the heat generated by a power electronics system.

However, such a solution cannot be applied to the field of aeronautics because of the significant additional weight that recourse to such a solution for removing the heat dissipated by a power electronics system of a propulsion unit of a large sized aircraft would have.

In addition, the weight of the various wiring used to supply electrical power or to transmit the electrical control signals, for example, is a significant factor in the overall weight of the propulsion unit, this weight penalizing the payload of the airplane.

It would therefore be beneficial to define a propulsion unit that had a novel architecture for cooling the power electronics system thereof and that also limited the weight of the wiring in general and the electric power supply wiring in particular.

The present invention seeks to alleviate the various disadvantages set out hereinabove by proposing a propulsion unit that is particularly simple in its design and mode of operation and that allows effective cooling of the power electronics system thereof.

Another object of the invention is to reduce the weight associated with the wiring of the propulsion unit.

SUMMARY OF THE INVENTION

To this end, the invention relates to a propulsion assembly for an aircraft comprising a nacelle comprising a nacelle cowl delimiting an internal volume in which there is placed an electric propulsion unit of the aircraft comprising a fan, an electric motor assembly placed after said propulsion unit and connected thereto in order to supply said propulsion unit with electrical energy when it is operating and a control system comprising a power electronics system, the space delimited between said motor assembly and said nacelle cowl defining a duct through which a stream of air created by said fan is intended to flow when said fan is operating to supply said aircraft with thrust.

According to the invention,
said power electronics system comprises at least one heat exchanger allowing heat energy to be transferred from said system to a working fluid in order to cool said system, and
said at least one exchanger is positioned so that it at least partially projects into said duct so that said working fluid consists of said stream of air generated by said fan when it is operating.

Because the power electronics system is housed in the nacelle, it is thus possible to take full advantage of the forced air stream generated by the fan. The air entering the nacelle is in fact accelerated by the fan so as to generate a stream of air that contributes to the thrust of the aircraft, this air stream increasing the efficiency of the exchanger placed in its path. This results in possible optimization in terms of mass and volume of this exchanger, leading to a reduction in the mass thereof.

Another technical advantage that stems from housing the electronics system in the nacelle is that the system is positioned as close as possible to the electric motor assembly, thereby reducing the weight associated with the wiring of the propulsion assembly.

In various particular embodiments of this assembly, each having its own particular advantages and which can be combined in numerous technically feasible ways:

said power electronics system comprises a power electronics module and an electronic control board which are connected to said at least one heat exchanger so as to remove the power dissipated by these elements by Joule effect, the assembly formed by said module and said board being housed in said nacelle cowl.

This assembly, formed by said module and said board, is housed in a housing defined between an internal wall and an external wall of said nacelle cowl.

with said nacelle defining a longitudinal axis, and with said motor assembly being connected to said nacelle by one or more sets of arms directed radially or substantially radially with respect to said longitudinal axis, at least the cables used for the electrical connections and/or for transmitting command signals pass through at least some of said arms, with said nacelle defining a longitudinal axis and with said motor assembly being connected to said nacelle by one or more sets of arms directed radially or substantially radially with respect to said longitudinal axis, at least some of said arms have at least one cooling scoop 24 to deflect some of the stream of air created by said fan toward said motor assembly with a view to cooling same.

Each scoop advantageously has a front face directed toward the stream of air arriving from the fan toward the corresponding arm so as to deflect some of this stream toward said motor assembly in order to cool same. This front face is, for example, partially domed to define a ramp directed toward said motor assembly.

said heat exchanger comprises fins 25, said fins being arranged so that they are positioned in the direction in which the stream of air created by said fan flows so as not to disturb this flow, said fan comprises blades that are able to rotate, each of said blades having an adjustable pitch, said electric propulsion unit comprises an adjustment device that allows the pitch of each of said fan blades to be adjusted in order to maintain the best possible efficiency, said power electronics system comprises an additional cooling device 27 in order to cool same.

This additional cooling device is, for example, a blower electrically connected to said motor assembly.

The present invention also relates to an aircraft equipped with at least one electric propulsion assembly.

According to the invention, this electric propulsion assembly is a propulsion assembly as described hereinabove.

BRIEF DESCRIPTION OF THE DRAWINGS

Further advantages, objects and particular features of the present invention will emerge from the description which will be given, by way of entirely nonlimiting explanation with reference to the attached drawings in which.

DETAILED DESCRIPTION OF EMBODIMENTS OF THE INVENTION

It will be noted first of all that the figures are not to scale.

Figure 1:
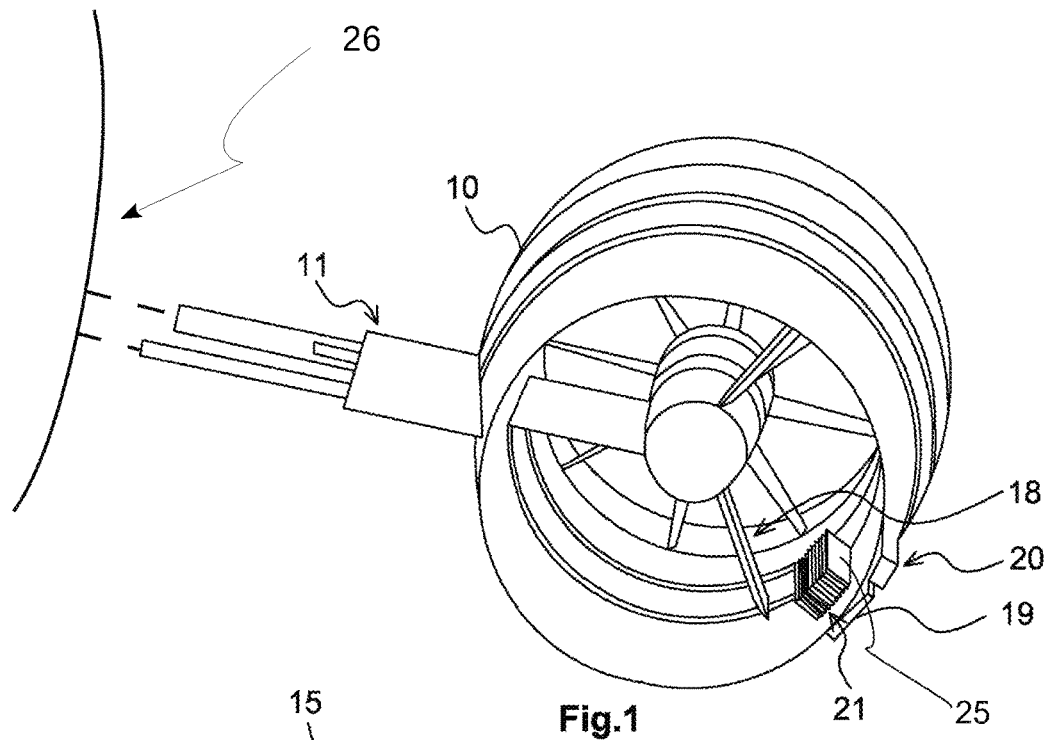
FIG. 1 is a perspective view of a propulsion assembly according to one particular embodiment of the present invention.
Figure 2:
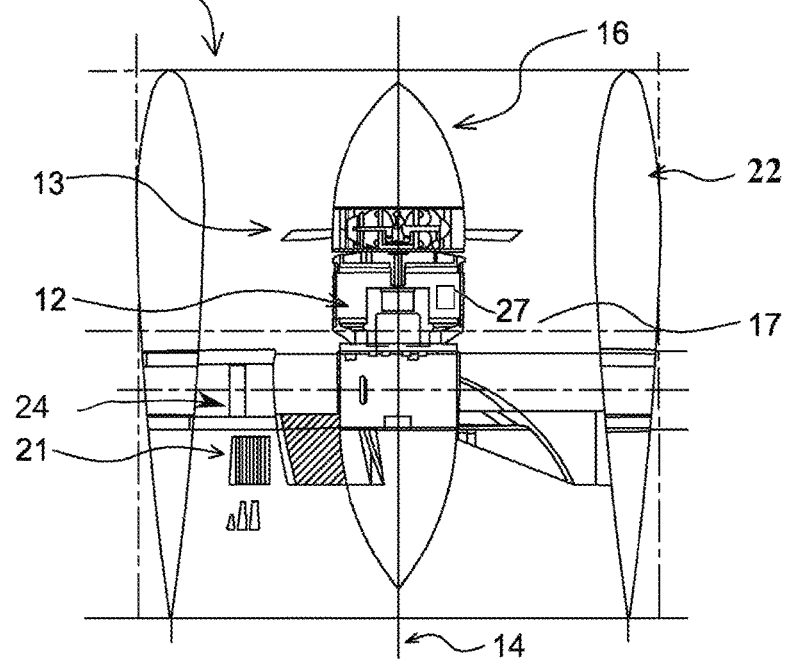
FIG. 2 is a longitudinal section of the assembly of FIG. 1.

FIGS. 1 and 2 show a hybrid electric propulsion assembly for an airplane according to a preferred embodiment of the invention.

This propulsion assembly comprises a nacelle 10 intended to be assembled by means of a mechanical connection 11 such as a pylon to a structural element of an aircraft 26. Purely by way of illustration, this structural element could be part of the wing structure of the aircraft, the assembly for example being positioned at the tip of this wing structure. This assembly could, however, be attached to some other point of the wing structure of this aircraft.

The nacelle 10 comprises a nacelle cowl 22 delimiting an internal volume in which an electric motor 12 that drives a fan 13 installed in front of this electric motor 12 is positioned. The nacelle 10 is arranged coaxially around the electric motor 12 about a longitudinal axis 14.

Simplistically, this propulsion assembly draws in external air at an air inlet 15 of the nacelle 10 using the fan 13 which has a ducted propeller, this fan 13 comprising a nose bullet 16. This stream of air drawn in and accelerated by the fan 13 is ducted through an annular space 17 defined between the exterior surface of the electric motor 12 and the internal wall of the nacelle cowl 22, toward a nozzle.

The nacelle 10 is connected directly to the tip of the wing using known techniques, allowing loads to be reacted in all directions. The nacelle 10 is mechanically connected to the electric motor 12 by one or more sets of arms 18, directed substantially radially with respect to the longitudinal axis 14.

The nacelle 10 further has a continuous exterior surface, which means to say one that has no discontinuities over at least the forward half of its length in the direction in which the air flows, so as to encourage laminar flow of air around the nacelle 10.

The propulsion assembly further comprises a control system comprising a power electronics system comprising a power electronic module 19 and an electronic control board 20 which are connected to a heat exchanger 21 so as to remove the power dissipated by these elements by Joule effect.

Whereas the power electronics module 19 and the electronic control board 20 are housed in the cowl of the nacelle 10, the heat exchanger 21 is positioned so that it projects into the annular space 17 that separates the exterior surface of the electric motor 12 from the interior surface of the cowl of the nacelle 10.

It is thus possible to take full advantage of the forced stream of air generated by the fan 13 to effectively cool the heat exchanger 21 thereby making it possible to optimize this heat exchanger 21 in terms of mass and volume so that its weight is limited as much as possible.

The invention claimed is:

1. An electric propulsion assembly for an aircraft comprising:

a nacelle comprising a nacelle cowl delimiting an internal volume to place an electric propulsion unit of the aircraft comprising a fan, an electric motor assembly connected to the electric propulsion unit to supply an electrical energy to the propulsion unit and a control system comprising a power electronics system, a space delimited between the motor assembly and the nacelle cowl defining a duct through which an air stream generated by the fan flows to supply the aircraft with a thrust;

the power electronics system comprises at least one heat exchanger to transfer a heat energy from the power electronics system to a working fluid to cool the power electronics system; and said at least one exchanger is positioned to at least partially project inwardly from the nacelle cowl into the space delimited between the motor assembly and the nacelle cowl so that the working fluid consists of the air stream generated by the fan.

2. The electric propulsion assembly as claimed in claim 1, wherein the power electronics system comprises a power electronics module and an electronic control board, said at least one heat exchanger is connected to the power electronics module and the electronic control board to remove heat dissipated by the power electronics module and the electronic control board by the Joule effect, an assembly formed by the power electronics module and the electronic control board is in the nacelle cowl.

3. The electric propulsion assembly as claimed in claim 1, wherein the nacelle defines a longitudinal axis; and wherein the electric motor assembly is connected to the nacelle by one or more sets of arms directed radially or substantially radially with respect to the longitudinal axis, at least some of the arms are configured to provide a passage to at least one of electrical connections and transmitting command signals.

4. The electric propulsion assembly as claimed in claim 1, wherein the nacelle defines a longitudinal axis; and wherein the electric motor assembly is connected to the nacelle by one or more sets of arms directed radially or substantially radially with respect to the longitudinal axis, at least some of the arms comprises at least one cooling scoop to deflect some of the air stream generated by the fan towards the electric motor assembly to cool the electric motor assembly.

5. The electric propulsion assembly as claimed in claim 1, wherein said heat exchanger comprises fins, the fins are arranged to be positioned in a direction in which the air stream generated by the fan flows so as not to disturb the flow of the air stream.

6. The electric propulsion assembly as claimed in claim 1, wherein the power electronics system comprises an additional cooling device to cool the power electronics system.

7. An aircraft equipped with at least one propulsion assembly as claimed in claim 1.

* * * * *